United States Patent [19]

Hopper et al.

[11] 4,208,903
[45] Jun. 24, 1980

[54] AUTOMATIC CARBONATION SHAKER

[75] Inventors: Everett S. Hopper, Venice, Fla.; Robert B. Buffington, Atlanta, Ga.

[73] Assignee: The Coca-Cola Company, Atlanta, Ga.

[21] Appl. No.: 4,831

[22] Filed: Jan. 19, 1979

[51] Int. Cl.² ............................................. G01M 3/00
[52] U.S. Cl. ............................................................ 73/52
[58] Field of Search ...................... 73/52, 19, 663, 667

[56] References Cited

U.S. PATENT DOCUMENTS

| | | |
|---|---|---|
| 1,211,942 | 1/1917 | Hoff ........................................ 73/52 |
| 1,539,937 | 6/1925 | Cochrane ................................ 73/52 |
| 3,277,697 | 10/1966 | Wittkuhns ............................. 73/667 |

FOREIGN PATENT DOCUMENTS 119008  8/1958  U.S.S.R. ...................................... 73/52

*Primary Examiner*—Gerald Goldberg
*Assistant Examiner*—Joseph W. Roskos
*Attorney, Agent, or Firm*—W. Dexter Brooks

[57] ABSTRACT

The present invention is directed to a carbonated beverage shaking machine which is designed to develop an equilibrium pressure in a beverage container. A support structure is provided which includes two parallel rods connected at one end to a base and an adjustable crossbar pivotally mounted adjacent the free ends of the rods. By adjusting the crossbar relative to the parallel rods the machine may accommodate a variety of various sizes of conventional beverage containers. The machine is designed to initially support a beverage container on the base portion in a vertical, upright position. Subsequently, the adjustable crossbar is lowered into position and locks the beverage container to the support frame. Simultaneously with the lowering of the crossbar, the beverage container is pierced with a needle which is connected to parameter measuring devices, such as a pressure gauge and a thermometer. Subsequently, the support frame and the container are lowered into a substantially horizontal position and shaken for a predetermined time interval. Thereafter, the pressure and temperature of the beverage are recorded by a technician.

14 Claims, 4 Drawing Figures

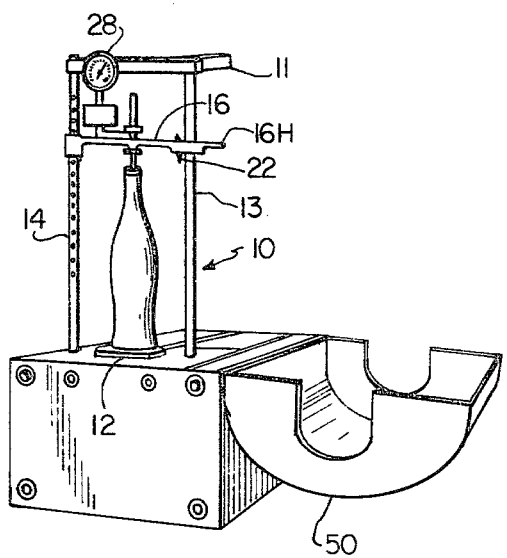
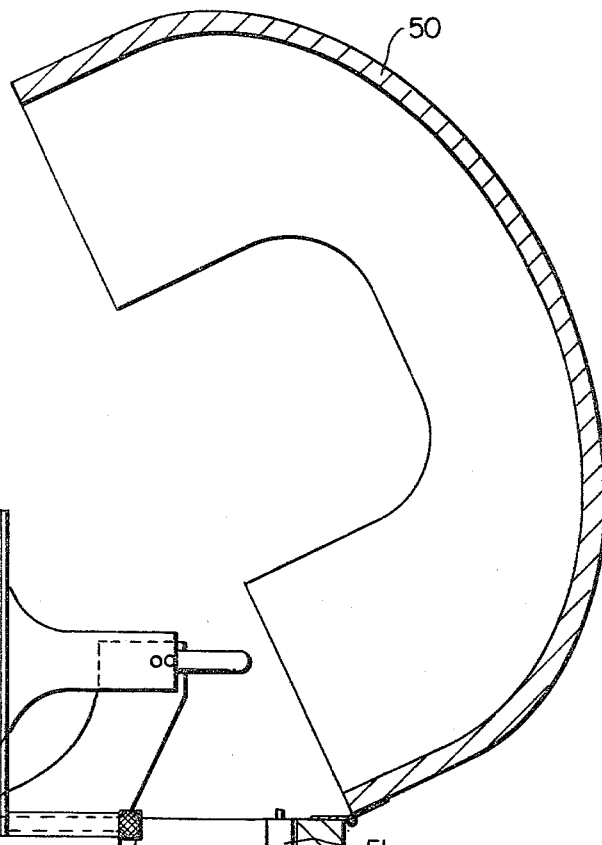
FIG. 4
FIG. 3

AUTOMATIC CARBONATION SHAKER

BACKGROUND OF THE INVENTION

1. Field of the Invention

The present invention is directed to a carbonated beverage shaking machine for developing equilibrium pressure in a container of carbonated beverage from an initial pressure which may be higher or lower than the equilibrium pressure.

2. Prior Art

Many exemplary shaking devices for use in a laboratory for producing either a swirling or reciprocating action in a laboratory flask are illustrated in the prior art.

For example, the patent issued to Hoff, U.S. Pat. No. 1,211,942, discloses a testing device which is clamped to and pierces the cap of a bottle. The member which pierces the cap is connected to a pressure gauge for indicating the pressure in the bottle.

The Cochrane patent, U.S. Pat. No. 1,539,937, discloses a pressure testing device for determining the pressure in a capped receptacle. The device includes a means to grasp the receptacle and a member which pierces the cap. A gauge is connected to the member which pierces the cap to measure the pressure within the receptacle.

The shaking machine of each of the above patents suffers from disadvantages which are solved by the apparatus of the present invention. The present invention sets forth a novel shaking machine for developing equilibrium pressure in a container of carbonated beverage from an initial pressure which may be higher or lower than the equilibrium pressure. The machine is designed to engage and pierce a beverage container in the vertical, upright position and subsequently lower the container to a horizontal position where it is shaken for a predetermined time interval. This shaking produces an equilibrium pressure within the container which may be recorded by a technician.

SUMMARY OF THE INVENTION

It is an object of the present invention to provide a shaking machine for producing equilibrium pressure in carbonated beverage containers.

A further object of the present invention is to provide a shaking machine adapted to accommodate various conventional sizes of beverage containers.

A further object of the present invention is to provide a machine in which a container can be positioned in a vertical, upright position for puncturing the container and, subsequently, lowered into a horizontal position for shaking the container for a predetermined time interval for producing equilibrium pressure in the beverage container.

A still further object of the present invention is to provide a carbonated beverage shaking machine which is light in weight so as to readily be portable from one testing facility to another.

These and other objects of the present invention are accomplished by producing a carbonated beverage shaking machine which includes two upwardly projecting support rods connected at their lower ends to a base member. A conventional size beverage container is positioned on the base member and a crossbar is lowered into position adjacent the top portion of the container to lock the container to a support frame. Upon lowering the crossbar into position to lock the container, a piercing needle punctures the cap of the container to connect a pressure gauge and thermometer to the interior of the container. Subsequently, the support frame is lowered into the horizontal position and the container is shaken, the technician operating the machine may check the pressure gauge to determine the equilibrium pressure and check the thermometer to determine the temperature of the beverage.

Further scope of applicability of the present invention will become apparent from the detailed description given hereinafter. It should be understood, however, that the detailed description and specific examples while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 illustrates a cross-sectional view taken along line B—B of FIG. 1; and

FIG. 4 illustrates the initial position of the carbonated beverage shaking machine support frame prior to being lowered to the horizontal position.

DETAILED DESCRIPTION OF THE INVENTION

Figure 1:
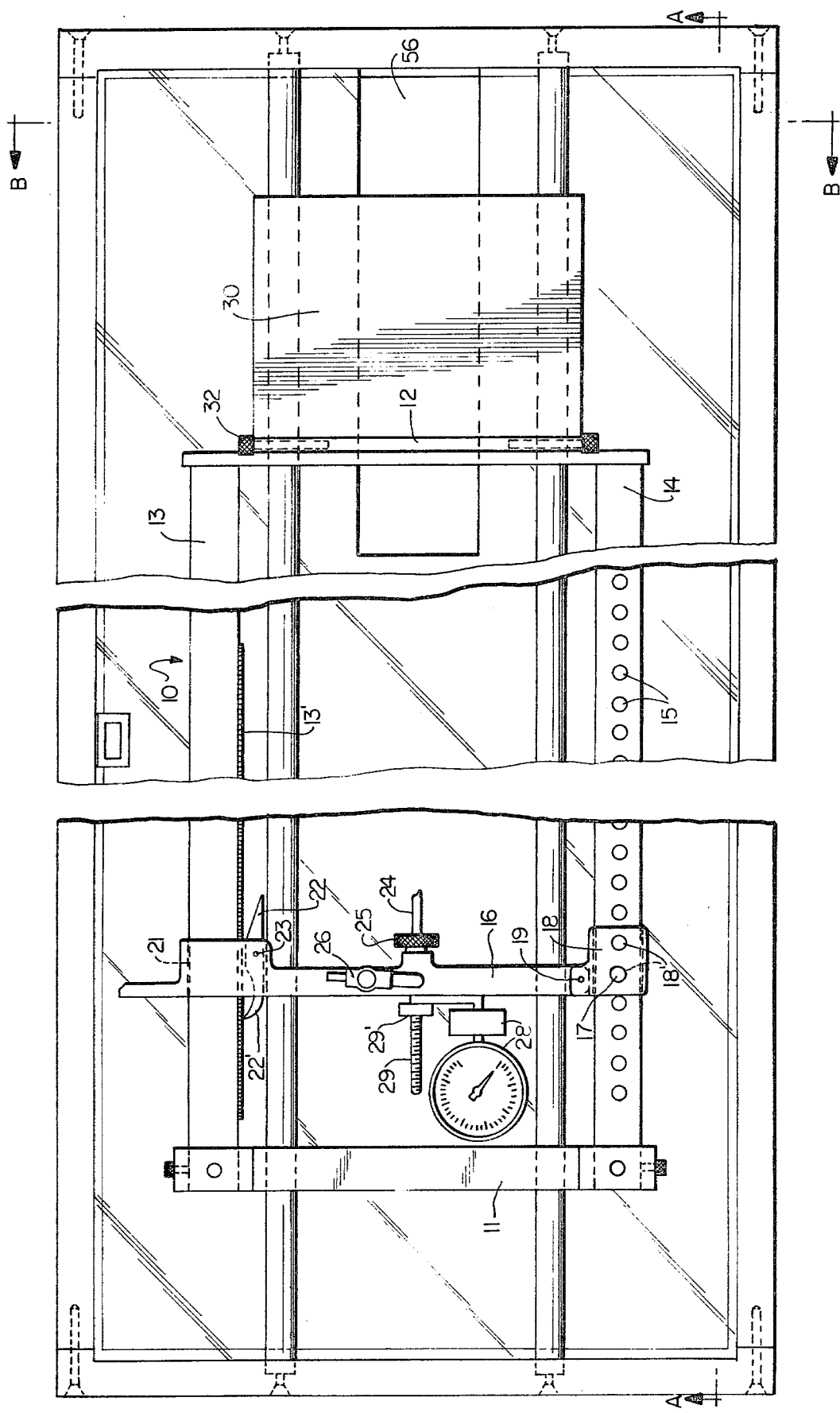
FIG. 1 illustrates a plan view of the carbonated beverage shaking machine of the present invention.

The carbonated beverage shaking machine of the present invention includes a box housing A in which the moving parts of the machine are positioned. A closure top 50 is hinged to the box housing A to prevent injury and to contain any spillage which may result if a shaken beverage container should accidentally break. As shown in FIG. 3, the closure top 50 is rounded to prevent the positioning of articles thereon.

The box housing A may include friction pads or vacuum cups positioned on the bottom thereof to dampen excessive vibration or motion of the carbonated beverage shaking machine.

Positioned within the lower portion of box housing A is a motor 41, a gear reducer 42, a cam wheel 43 and a timer 52. A protective sheet 55 is positioned within the box housing A and is designed to overlay the electrical and mechanical components of the machine to prevent damage if a shaken container should accidentally break. The protective sheet 55 includes an opening 56 designed to accommodate the trunnion pivot mount 34. It should be understood that the protective sheet 55 may be sloped to one corner of the box housing A which includes a drain opening (not shown) to facilitate the cleaning of the machine upon the accidental breakage of a beverage container.

Mounted adjacent the upper portion of the box housing A are two shaker rods 35. The shaker rods 35 extend across the entire length of the box housing A and act as guides for the block slider 30 as it is reciprocated by the connecting rod 45 attached to the cam wheel 43.

The shaking motion imparted to a beverage container is governed by three variables, namely, the amplitude, frequency and duration of shaking. In a preferred embodiment of the present invention an amplitude of 0 to 3 inches, a frequency of 0 to 600 cycles/minute and a shaking time of 0 to 1 minute were found to produce acceptable results. In the present invention these variables may be adjusted to correspond to the desired machine operating characteristics.

Figure 2:
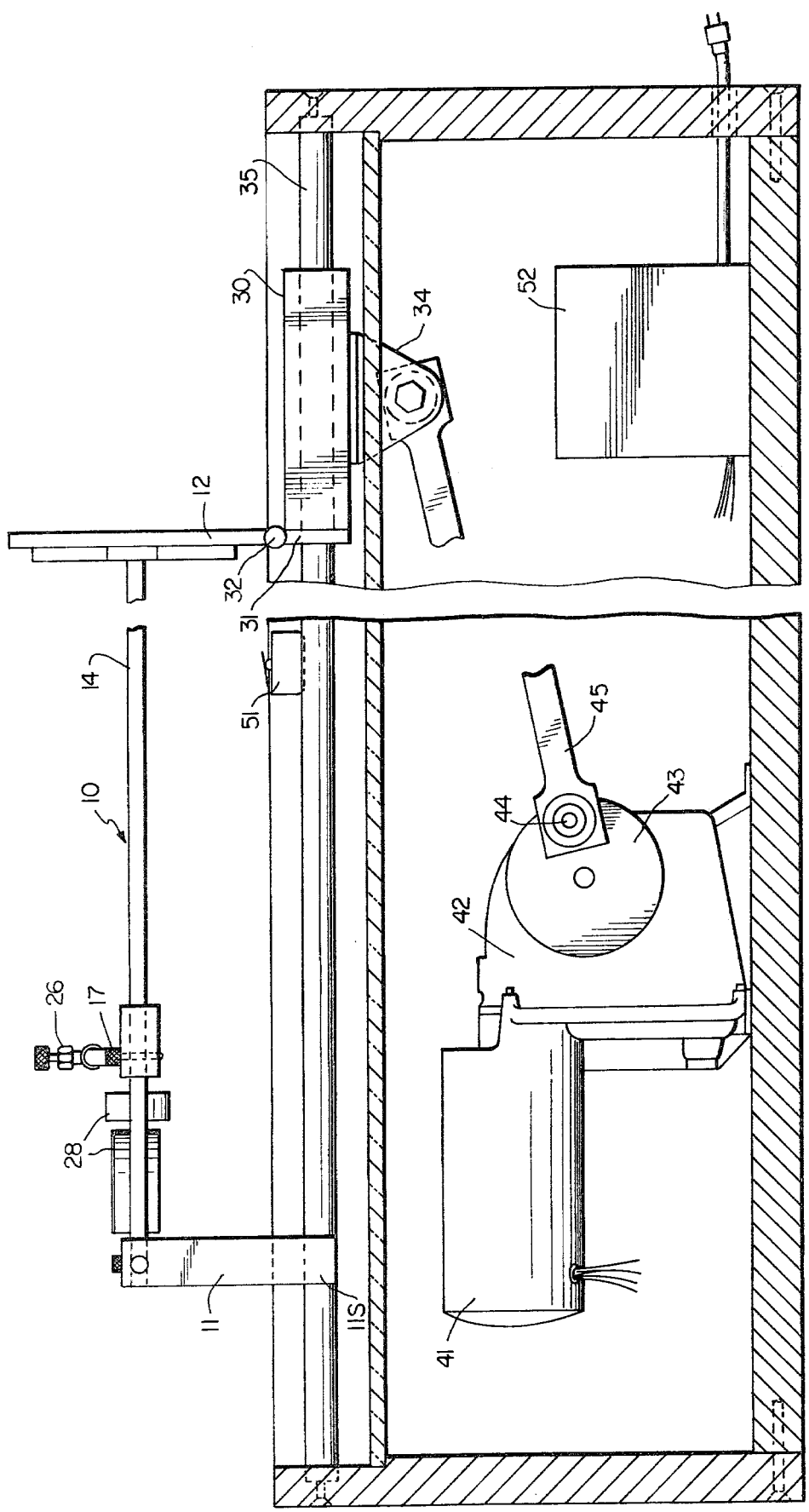
FIG. 2 illustrates a side view taken along A—A of FIG. 1.

The support frame 10, illustrated in FIGS. 1, 2, and 4, includes a base plate 12, two support rods 13, 14 and a crossbar 16. As illustrated in FIG. 4, initially the support frame 10 is in the vertical, upright position so that a technician may position a conventional beverage container on the base plate 12.

The support rod 14 includes a plurality of holes 15 which may be evenly positioned along the length of the rod. The crossbar 16 includes a slider 18 designed to slidably engage the support rod 14. A hinge 19 connects the slider 18 to the crossbar 16.

In a preferred embodiment of the present invention, the holes 15 in the support rod 14 may be ¼ inch holes which are spaced on ½ inch centers. The slider 18 may include two ¼ inch holes 18' which are spaced on ¾ inch centers. In this arrangement, the position of the slider 18 relative to the support rod 14 may be moved in ¼ inch intervals along the entire length of the support rod. After an individual has determined the exact position of the slider 18 relative to the support rod 14, he would merely insert a removable pin 17 into one of the openings 18' in the slider 18 and one of the holes 15 in the support rod 14 to affix the two elements relative to each other. The removable pin 17 may include a spring wire to securely hold the removable pin within the holes 18' and 15.

As illustrated in the drawings, the crossbar 16 extends from the support rod 14 to the support rod 13. The portion of the crossbar 16 which is adjacent the support rod 13 is slotted so as to be readily moved along the support rod 13. The slot in this portion of the crossbar is wider than the support rod 13 so that, while the slider member 18 is secured to the support rod 14, the slotted portion may be moved a few inches up and down to permit clamping and unclamping of a beverage container within the support frame 10.

The support rod 13 includes a ratchet strip 13' positioned along one edge thereof which acts in combination with the slotted portion 21 and a ratchet release lever 22 to removably retain the slotted portion of the crossbar 16 to the support rod 13. A pivot pin 23 secures the ratchet release lever 22 within the slotted portion 21 of the crossbar 16.

A piercing needle 24 is positioned on the crossbar 16 and is designed to puncture the cap of a beverage container. The piercing needle 24 is connected to the crossbar 16 by means of a packing nut 25. In addition, a rubber seal (not illustrated) is utilized to seal the puncture in the cap or lid of the beverage container to prevent loss of pressure. Further, the piercing needle 24 is hollow and is in communication with a means for measuring internal physical parameters, such as a diaphragm pressure gauge 28 and a thermometer 29. A pressure relief valve 26 is also in communication with the opening in the piercing needle 24 so as to relieve the pressure within the beverage container after the pressure and temperature have been measured and recorded.

As illustrated in FIGS. 1 and 4, the diaphragm pressure gauge 28 is positioned to one side of the piercing needle 24. Aligned with the piercing needle 24 is a compression gasket 29' which is designed to permit the insertion of a thermometer 29. In another embodiment of the present invention, the compression gasket 29' may be an "O" ring which is designed to permit the insertion of the thermometer 29.

The support frame 10 is pivotally mounted to a block slider 30 by means of a hinge plate 31 and hinge pins 32. The reciprocating motion of the block slider 30 is guided by means of the shaker rods 35.

As illustrated in FIGS. 2 and 3, the motor 41 supplies rotary motion to the gear reducer 42 and a cam wheel 43 is connected to the output shaft of the gear reducer 42. A connecting pin 44 attaches the connecting rod 45 to the cam wheel 43. Motion imparted to the cam wheel 43 is converted into a reciprocating motion which is supplied to the block slider 30 through the trunnion pivot mount 34.

OPERATION OF THE PREFERRED EMBODIMENT

As illustrated in FIG. 4, a technician would initially position a beverage container on the base plate 12 in the vertical upright position. Subsequently, the slider 18 of the crossbar 16 is positioned along the support 14 to accommodate the longitudinal dimension of the beverage container. After the slider 18 is properly positioned, a removable pin 17 is inserted through one of the openings 18' and an opening 15 to securely attach the slider 18 to the support rod 14. Upon securing the slider 18, the technician would grasp the handle 16H and pivot the crossbar 16 downwardly. Simultaneously with the lowering of the crossbar 16, the piercing needle 24 punctures the cap or lid of the beverage container and thereby connects the contents of the beverage container to the pressure gauge 28 and the thermometer 29. It should be understood that a technician may easily puncture the cap of the beverage container without exerting excessive force because of the leverage produced by the convenient handle 16H and the pivot connection of the crossbar 16 to the slider 18. Further, as the crossbar 16 is lowered into position, the ratchet projection 22' of the ratchet release lever 22 engages the ratchet strip 13' to securely attach the slotted portion 21 of the crossbar 16 to the support rod 13.

After a technician has lowered the crossbar 16 into position, a beverage container is securely locked to the support frame 10. Subsequently, the support frame 10 is pivoted from the vertical, upright position to a horizontal position as illustrated in FIGS. 1 through 3. The base plate 12 of the support frame 10 is hinged to a hinge plate 31 by means of the hinge pins 32 and the hinge plate 31 is attached to the block slider 30.

As illustrated in FIGS. 1 and 2, reciprocating motion of the block slider 30 is guided by means of the shaker rods 35. Further, the upper ends of the support rods 13 and 14 are guided on the shaker rods 35 by means of a top end support 11. The top end support 11 includes two slots or notches 11S which are adapted to slide on the shaker rods 35. As illustrated in FIG. 2, the support frame 10 is maintained in the horizontal position by the base plate 12 which is mounted on the block slider 30 and the top end support 11. Designing the top end support 11 to include slots or notches 11S permits the pivoting of the support frame 10 from the vertical, upright position to the horizontal position.

Upon lowering the beverage container which is locked to the support frame 10 to the horizontal position, the cover 50 is rotated to the closed position which would automatically close the actuating switch 51. Upon closing the actuation switch 51, power is supplied through the timing unit 52 to the motor 41. The timing unit 52 may be set at any predetermined time interval which would in turn operate the motor 41 for a predetermined time and thereby impart a predetermined number and duration of reciprocations to the block slider 30. After the expiration of the predetermined time interval, the motor 41 is deactuated.

The carbonated beverage shaking machine of the present invention is designed to shake the beverage container for a predetermined time interval to develop equilibrium pressure within the container from an initial pressure which may be higher or lower than the equilibrium pressure. After the container is shaken for a predetermined time interval, the technician may record the internal physical parameters, i.e., the pressure reading of the diaphragm pressure gauge 28 and the temperature reading of the thermometer 29. The present invention may also be used in combination with electronic equipment which will automatically detect and record the internal physical parameters.

After the technician has recorded the pressure and temperature of the carbonated beverage, the support frame 10 is pivoted from the horizontal position to the vertical position. In the vertical position the technician may release the pressure by means of the pressure release valve 26. After the pressure is released, the ratchet release lever 22 may be pivoted to release the ratchet projection 22' and thereby permit the upward rotation of the crossbar 16 about the hinge 19. The upward rotation of the crossbar 16 will remove the piercing needle 24 from the cap of the beverage container. Thus, the upward motion of the crossbar 16 releases the beverage container from the support frame 10. Upon removing the tested beverage container, the machine is now ready for further testing.

As previously discussed, the carbonated beverage shaking machine of the present invention is designed to accommodate a variety of conventional beverage containers. For example, the support frame of the machine may retain conventional soda bottles or cans, conventional wine bottles, and other conventional containers for carbonated beverages. Further, by pivoting the support frame to the vertical position after the beverage container is shaken, a technician may easily release the pressure and remove the beverage container from the support frame without spilling the contents of the container.

The carbonated beverage shaking machine of the present invention may readily be used to check the carbonation of a sample number of beverage containers as they are produced in a bottling plant. The machine is portable which enables it to be used adjacent the bottling line or at any desired location.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for testing the internal physical parameters of a closed liquid-filled container with an axis passing therethrough substantially perpendicular to a closure member for said container comprising:
   means for securing said liquid-filled container with said axis in a substantially vertical plane;
   means for pivoting said liquid-filled container to a position wherein said axis thereof lies in a substantially horizontal plane;
   means for shaking said liquid-filled container for a predetermined period of time while said axis of said container lies in said horizontal plane; and
   means for measuring internal physical parameters within said liquid-filled container at the end of said predetermined period of time.

2. An apparatus according to claim 1, wherein said means for securing said liquid-filled container with said axis thereof in a substantially vertical plane includes a support frame and a releasable locking crossbar to retain said container to said support frame.

3. An apparatus according to claim 2, wherein said crossbar is adjustably positioned on said support frame so as to accommodate a variety of various sizes of liquid-filled containers.

4. An apparatus according to claim 3, wherein one end of said crossbar is pivotally mounted to a slider member mounted for slidable movement along a first support rod of said support frame and adapted to be releasably secured thereto.

5. An apparatus according to claim 4, wherein the other end of said crossbar includes a slot opening and a ratchet release lever for releasably securing said crossbar to a second support rod of said support frame.

6. An apparatus according to claim 4, wherein a piercing device for puncturing said liquid-filled container is mounted on said crossbar and the pivot connection of said crossbar to said slider member provides the leverage necessary to easily puncture a closure element of said liquid-filled container.

7. An apparatus according to claim 2, wherein said support frame is pivotally mounted to a block slider so that a liquid-filled container may be initially locked to said support frame with said axis thereof in a substantially vertical plane and pivoted to a position wherein said axis thereof lies in a substantially horizontal plane.

8. An apparatus according to claim 7, wherein said block slider is mounted on rods and operatively connected to a drive mechanism which imparts reciprocating motion to said block slider to thereby shake said liquid-filled container.

9. An apparatus according to claim 1, wherein said means for shaking said liquid-filled container includes a block slider which is operatively connected to a drive mechanism, said drive mechanism imparts a reciprocating motion to said block slider to thereby shake said liquid-filled container.

10. An apparatus according to claim 9, wherein said drive mechanism is supplied with power by a timer mechanism which is actuated upon the closing of a closure cover.

11. An apparatus according to claim 9, wherein a protective sheet is positioned between said liquid-filled container which lies in a substantially horizontal plane and the drive mechanism to prevent damage to the drive mechanism if a liquid-filled container should accidentally break.

12. An apparatus according to claim 11, wherein said protective sheet is positioned at an angle to readily drain any spillage from a broken container and further includes an opening therein through which the connecting rod from the drive mechanism to said block slider projects.

13. An apparatus according to claim 1, wherein said means for measuring the internal physical parameters of said liquid-filled container includes a piercing device adapted to puncture a closure member of said container and being in communication with a pressure gauge.

14. An apparatus according to claim 1, wherein said means for measuring the internal physical parameters of said liquid-filled container includes a piercing device adapted to puncture a closure member of said container and being in communication with a thermometer.

* * * * *